United States Patent
Kim

(10) Patent No.: US 7,801,648 B2
(45) Date of Patent: Sep. 21, 2010

(54) AUTOMATIC TRIP DEVICE AND CONTROL METHOD THEREOF

(75) Inventor: Gi-Young Kim, Anyang (KR)

(73) Assignee: Hanbit Tech Inc., Anyang (KR)

( * ) Notice: Subject to any disclaimer, the term of this patent is extended or adjusted under 35 U.S.C. 154(b) by 546 days.

(21) Appl. No.: 11/533,918

(22) Filed: Sep. 21, 2006

(65) Prior Publication Data

US 2007/0276613 A1 Nov. 29, 2007

(30) Foreign Application Priority Data

May 23, 2006 (KR) .................. 10-2006-0046229

(51) Int. Cl.
*H02H 5/04* (2006.01)
(52) U.S. Cl. .................. 700/293; 700/292; 361/103; 335/44
(58) Field of Classification Search .......... 700/292, 700/293; 361/103, 106; 335/44
See application file for complete search history.

(56) References Cited

U.S. PATENT DOCUMENTS 6,222,714 B1 * 4/2001 Hoffman .................. 361/93.2
6,424,266 B1 * 7/2002 Weekes et al. .............. 340/588
2007/0247767 A1 * 10/2007 Zhang ........................ 361/42

* cited by examiner

*Primary Examiner*—Ryan A Jarrett
(74) *Attorney, Agent, or Firm*—KED & Associates LLP

(57) ABSTRACT

An automatic trip device, a network system using it and control method thereof is related to providing the prediction of a potential electrical accident, in which measuring data including a temperature and a current from each of temperature and current sensors is received, the measuring data is stored in a data memory, the measuring data and a setting data are compared with each another and analyzed, an indicating portion display the life spans of an appliance equipment and mechanism and a power line section accommodating the interrupter, a temperature resistance coefficient based on the temperature stored is calculated, the temperature resistance coefficient is compared with one previously stored for the warning, the power line is interrupted and a warning portion is controlled to generate a warning signal if the calculated temperature resistance coefficient is higher than the warning temperature resistance one, thereby interrupting an accidental high current, rapidly, to protect persons and installments in itself, preventing the spreading of a general failure of power supply and minimizing an amount of damages.

4 Claims, 9 Drawing Sheets

AUTOMATIC TRIP DEVICE AND CONTROL METHOD THEREOF

TECHNICAL FIELD OF THE INVENTION

The invention is related to providing an automatic trip device for interrupting a power supply, a network system using it and control method thereof, and in particular, to providing an automatic trip device, a network system using it and control method thereof for predicting a potential electrical accident, so that an accidental high current is rapidly interrupted to protect persons and installments in itself and prevent the spreading of a general failure of power supply, thereby minimizing an amount of damages.

BACKGROUND OF THE INVENTION

Conventional overload protecting equipments, mechanisms and/or installments used in a larger plant or industrial fields function to be a protector to detect/interrupt a specific current and/or use a fuse to interrupt a power supply at more than a specific temperature, which are commercially obtainable, but these often caused causalities and a great amount of losses and damages to a society due to a failure of the properly interruption to the power supply.

Substantially, as a current on a power line applied to a motor having a rotational shaft is transited into an instantly peak one, it is known that the electrical line is designed to stand by two times of a maximum acceptable current. But, an electrical accident often occurs at a death zone; adjacent to an input terminal of a relay device that divides a larger current into a smaller current.

A temperature fuse has its own inherent error operational property, which is not widely used in an industrial field. At that case that electrical appliance equipment consumes a maximum current at its normal state, a temperature of an electrical line connected thereto and its surface temperature may be often raised following by influencing a room temperature, so it makes the appliance equipment or mechanism difficult to be accurately controlled. Further, it is difficult to spot the breakage of the temperature fuse, visibly, and to make the maintenance and repair thereof without being monitored.

In other words, interrupters, electrical lines, cables, receptacles, other power appliances, etc. are being deteriorated due to their use environment and condition or a number of factors caused in their electrical circuit, so it often results in an important cause of an electrical accident or causes an electrical accident, directly. Even through the same appliances are used, they may have a little difference according to their use conditions.

General gradual failure factors are as follows:
① It often happens due to an arc loss followed by an opening/closing of a surge voltage and an overload current that are known as an electrical factor.
② It often happens due to an overload, breakage, undesirable harmonic wave inflow, heat cycle (Expanding & Extracting, Stress, Distortion, and Elasticity deteriorating that are known as a thermal factor.
③ It often happens due to fatigues, cracks, breakages, abrasion, deformation, poor contact, etc. caused by the repetitive operating, external stress, vibration, impact, over current or short-circuit, etc. which are known as a mechanical factor.
④ It often happens due to the dusts, strains, salts attached, humidity, high temperature, corrosiveness, ultraviolet ray (poor surface insulations), grease hardness (poor operating), metal corrosion (poor contact, breakage), deterioration of an insulating material, etc. that are known as an environmental factor.
⑤ It often happens due to the insulating deterioration, partly discharging phenomena (corrosion accelerated by a chemical forming material followed by a corona phenomena), etc. that are known as a chemical factor.

In the progress of the deterioration due to these factors as described above, interrupters, electrical lines, cables, adapters or receptacle, other power equipments and mechanisms, etc. increase the resistance to a temperature resulted from its temperature coefficient, whereby an amount of current that is generated by their overload operating is reduced, it blocks the operating of their interrupter, thereby causing a fire.

In cases that the deterioration happens due to such like gradual failure factors, interrupters, electrical lines, cables, adapters or receptacle, other power equipments and mechanisms, etc. raises its temperature due to the increasing of the frictional resistance, so their deteriorating phenomena become repetitive.

Herein, it is noted that the temperature coefficient is a rate of increasing or decreasing an inherent resistance of an electrical appliance equipment and mechanism according to the raising or lowering of a temperature. The more the temperature coefficient is increased, the more the inherent resistance is. At that time, a current flowing into the interrupter of the electrical appliance equipment and mechanism is reduced enough to be not initiated in itself, and on the contrary, a leakage current is increased, so it may be a cause that accidental fire or accident may happen resulting from causalities or losses of tangible and intangible properties.

In order to resolve these and those problems, one object of the invention is to provide an automatic trip device, a network system using it and control method thereof to check a temperature of a power line using a temperature sensor, calculate its resistance temperature coefficient and change the maximum allowance current according to the resistance temperature coefficient, so that if a current over a setting current is detected, they are automatically tripped in an independent or a group.

Another object of the invention is to provide an automatic trip device, a network system using it and control method thereof to automatically change a setting current value that is a maximum allowance current by the reference of a data calculated from a temperature coefficient.

Another object of the invention is to provide an automatic trip device, a network system using it and control method thereof to measure a temperature of a power line and a current used, judge whether it is abnormal, give a warning and interrupt the power supply, thereby preventing the overheating of the power line.

Another object of the invention is to provide an automatic trip device, a network system using it and control method thereof to grasp the power use state of a district provided with electrical appliance equipments and mechanisms at a glance and predict a potential accident occurrence, thereby preventing the accident of causalities, fires, property losses, etc.

SUMMARY OF THE INVENTION

According to these and those objects of the invention, an automatic trip device comprises a temperature sensor for detecting a temperature of a power line; a current sensor for measuring a current of the power line, a data memory for storing the temperature and current data measured from each of the temperature sensor and the current sensor therein; a trip portion for interrupting the power supply from the power lines based on a control signal; an external trip signal inputting portion requesting the interruption of a power supply through the power line out of outside; an indicating portion for displaying a life span of an interrupter based on its driving control signal; a warning portion for giving a warning signal to an alarm, etc. based on its driving control signal; a control portion for receiving measuring data including a temperature and a current from each of the temperature and current sensors, storing the measuring data in the data memory, comparing the measuring current with a setting current for the operating of a system and controlling the trip portion to interrupt the current flowing on the power line, if the measuring current is higher than the setting one, analyzing the measuring data and controlling the indicating portion to display the life spans of an appliance equipment and mechanism and a power line section accommodating the interrupter, calculating a temperature resistance coefficient based on the temperature stored, comparing it with a temperature resistance coefficient previously stored for the warning and controlling a warning portion to generate a warning signal if the calculated temperature resistance coefficient is higher than the warning temperature resistance one; and a data communicating portion for communicating with another communicating device outside to transmit the calculated data and analyzed data.

An automatic trip method for controlling an automatic trip device comprises steps of measuring a temperature of a power line to calculate its temperature coefficient, collecting the calculated temperature coefficients and analyzing them, and determining the analyzed temperature coefficient into a setting current value that is a maximum allowance current of the trip device.

A control method of an automatic trip device comprises steps of performing initializing procedures of setting a temperature resistance coefficient for warning and setting a current measured on the power line on the basis of the warning temperature resistance coefficient as a setting current; measuring a temperature of the power line and calculating the temperature resistance coefficient to store them in a memory; judging whether the calculated temperature resistance coefficient is higher than the warning one; controlling a warning portion to give a warning signal, if the calculated temperature resistance coefficient is higher than the warning one; calculating a setting current flowing on the power line based on the warning temperature resistance coefficient to store it in the memory, if the calculated temperature resistance coefficient is smaller than the warning one, measuring an ongoing current on the power line to store it in the memory; judging whether a value dividing the setting current by the initial current is higher than the initial deteriorating one and then, if so, giving a replacement signal of an interrupter; if not, judging whether the setting current is smaller than the measuring current and then outputting a trip signal if the setting current is smaller the measuring one; judging whether an external trip signal is inputted, if the setting current is higher than the measuring one, and then terminating a system programming if so, and on the contrary, controlling a communicating portion to receive data including the temperature coefficient, the setting current, the ongoing measuring current, the interrupter replacement signal and the trip signal, transmitting the data to a system computer and returning to the step of storing the data to repetitively perform the following procedures.

A network system for automatic trip devices comprises a system computer mounted in the utmost layer to process, analyze and display data collected from automatic trip devices placed in its lower layers in order to enable users to be grasped and transmit user's commands to the lower layers; a plurality of automatic trip devices mounted in intermediate layers to analyze/compare data collected from its lower layers and transfer them to the system computer and automatic trip device in its upper intermediate layers; and a plurality of automatic trip devices mounted in the lowest layers and directly connected to appliance equipments and mechanisms to collect data including a current, a frequency, temperature, etc., and detect an emergency state in order to interrupt the power supply and transmit the collected data to the automatic trip devices placed in its upper intermediate layers.

The computer system comprises a monitor for monitoring a state of each of automatic trip devices connected to be constituted as the network system; a microprocessor for controlling each of portions connected thereto to receive data from all automatic trip devices connected to be constituted as the network system through a wire or wireless communication device, store the received data in a store device and process the data to display the processed results on the monitor; the storing device for storing the data related to the state of each of the automatic trip devices inputted through the network system therein; a system bus providing passages to transmit the data and signals between the microprocessor and each of the devices; a wire and wireless communication device providing the data communication between each of the automatic trip devices mounted on the receptacle, terminal equipments, the sub-interrupter, etc. and the microprocessor; and a remote monitoring communication device for displaying the data inputted from each of automatic trip devices mounted on the receptacle, the terminal equipments, the sub-interrupter, etc.

BRIEF DESCRIPTION OF THE DRAWINGS

The invention will be explained in detail with reference to the attached drawings, in which.

DETAILED DESCRIPTION OF THE INVENTION

Figure 1:
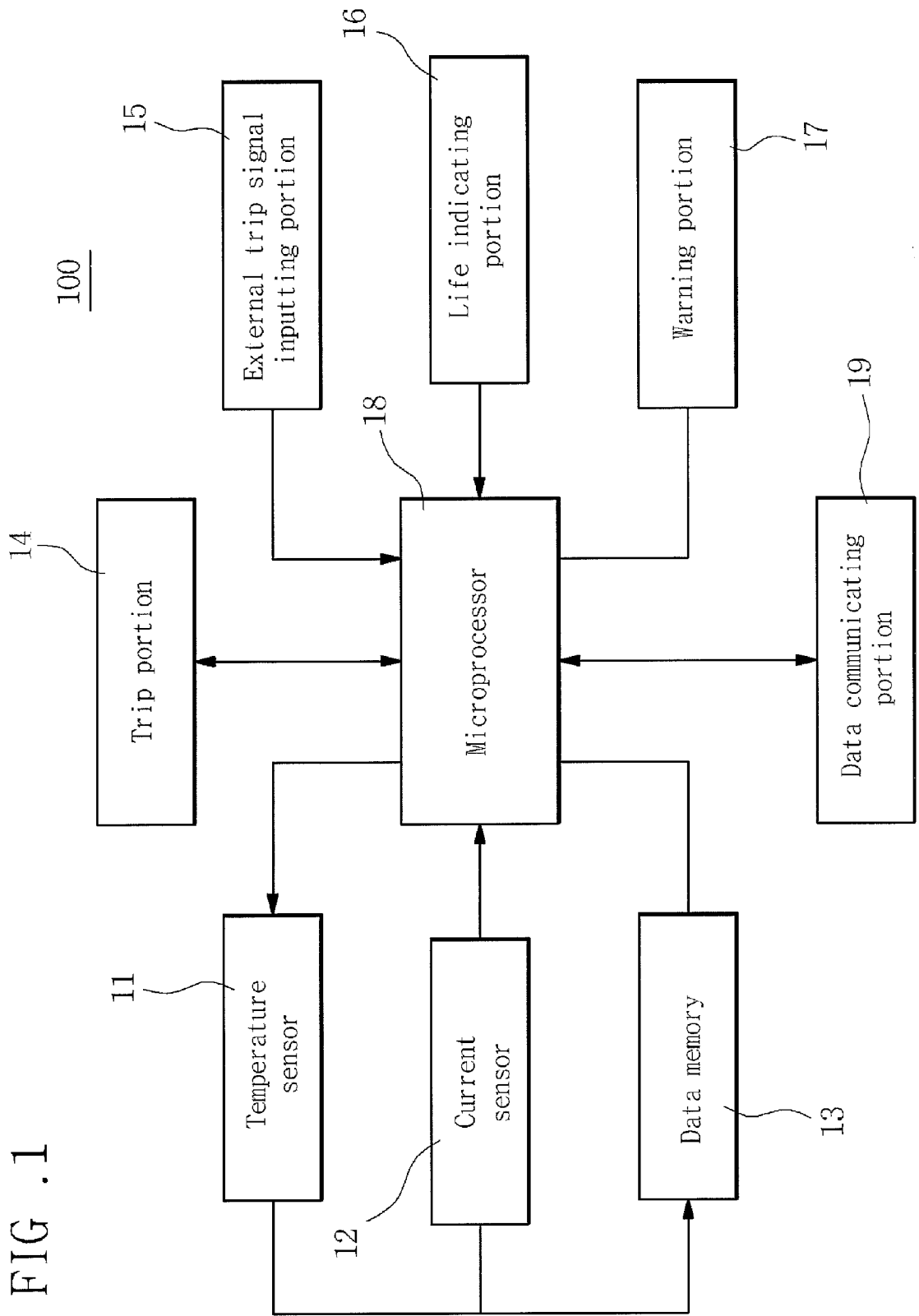
FIG. 1 is a schematic block diagram illustrating a configuration of an automatic trip device according to the invention.

FIG. 1 is a block diagram illustrating a configuration of an automatic trip device according to the invention. The automatic trip device 100 comprises a control portion 18 including a microprocessor. A temperature sensor 11 detects a temperature of a power line to transmit it to the control portion 18. A current sensor 12 measures a current of the power line to transmit it to the control portion 18. A data memory 13 stores the temperature and current data measured from each of the temperature sensor and the current sensor therein. A trip portion 14 interrupts the power supply from the power line based on a control signal received from the control portion 18. An external trip signal-inputting portion 15 requests for the control portion 18 to interrupt the power supply through the power line out of outsides. An indicating portion 16 displays a life span of an interrupter based on a control signal from the control portion 18. A warning portion 17 gives a warning signal to an alarm or another warning devices (not shown) based on a control signal from the control portion 18. The control portion 18 receives measuring data including the temperature and current from each of the temperature and current sensors 11 and 12, stores the measuring data in the data memory 13, compares the measuring current with a setting current for the operating of a system, controls the trip portion 14 to interrupt the current flowing on the power line, if the measuring current is higher than the setting one, analyzes the measuring data and controls the indicating portion 16 to display the life spans of an appliance equipment and mechanism and a power line section accommodating the interrupter, calculates a temperature resistance coefficient based on the temperature stored, compares it with a temperature resistance coefficient previously stored for the warning and controls the warning portion 17 to generate a warning signal if the calculated temperature resistance coefficient is higher than the warning temperature resistance one. A data-communicating portion 19 communicates with another communicating device outside to transmit the calculated data and analyzed data.

Figure 2:
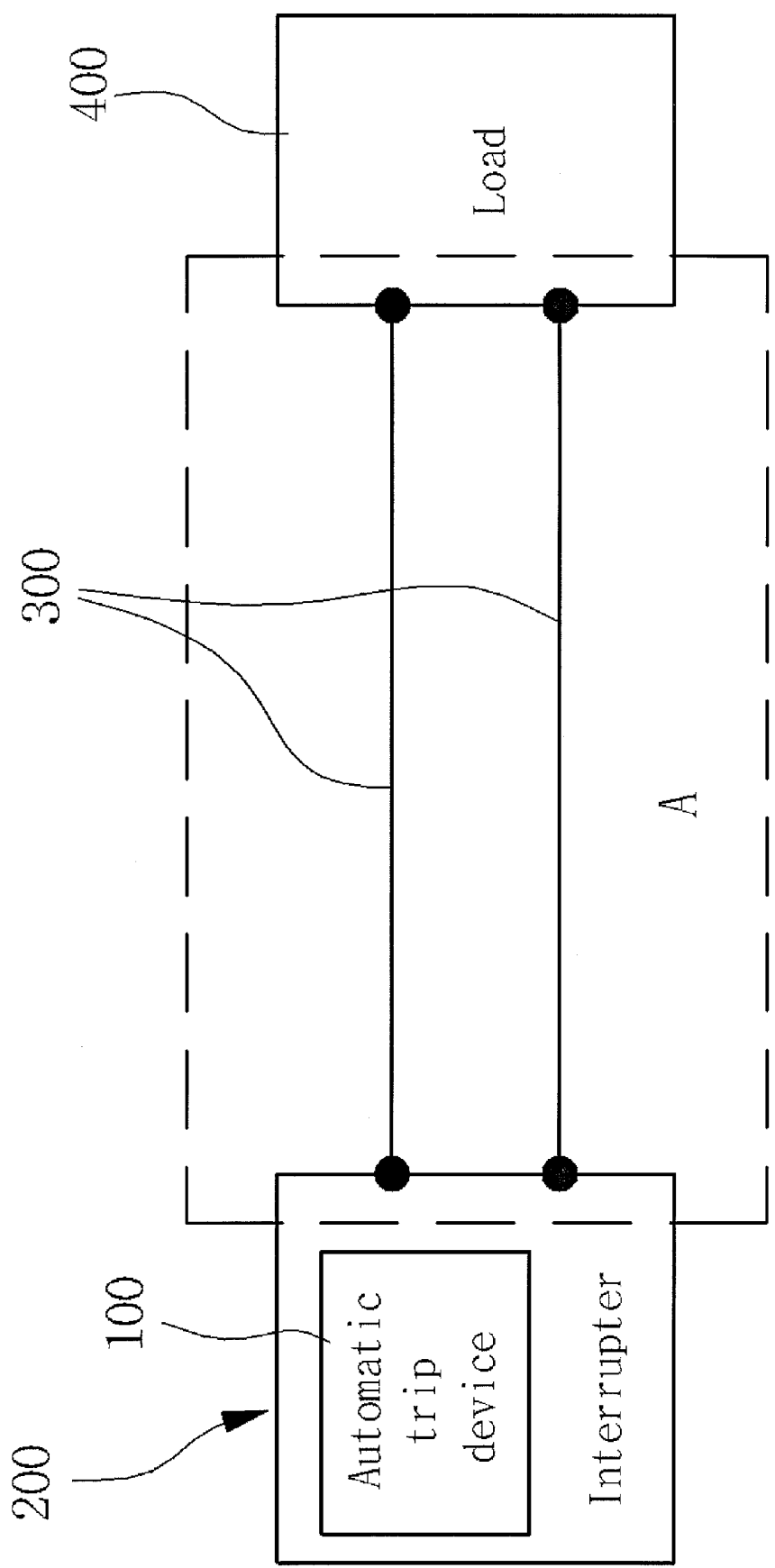
FIG. 2 is a simple block diagram illustrating one embodiment of connecting to a load an automatic trip device according to the invention.

FIG. 2 shows an automatic trip device connected to a load according to one embodiment of the invention. An interrupter 200 accommodates the automatic trip device 100, which is connected in parallel to a power line 300. The automatic trip device 100 includes a temperature sensor 11 to measure a temperature of power lines 300 in an A section every a predetermined time period, for example one-thousandth second. The power line 300 is made of a copper wire that generates a heat due to its impedance component.

General power cables have a usable temperature range a little different from each another in the standardization of their electrical wires. The temperature range is normally 5° C.~60° C. The maximum usable temperature is 80° C. or so, but the use of 24 hours under this state may results in the lowering or stressing of the electrical wire function, which is a state necessary for the warning. The temperature of the electrical wire's breakage is 150° C. or so, which is a danger state that may make a fire.

Figure 3:
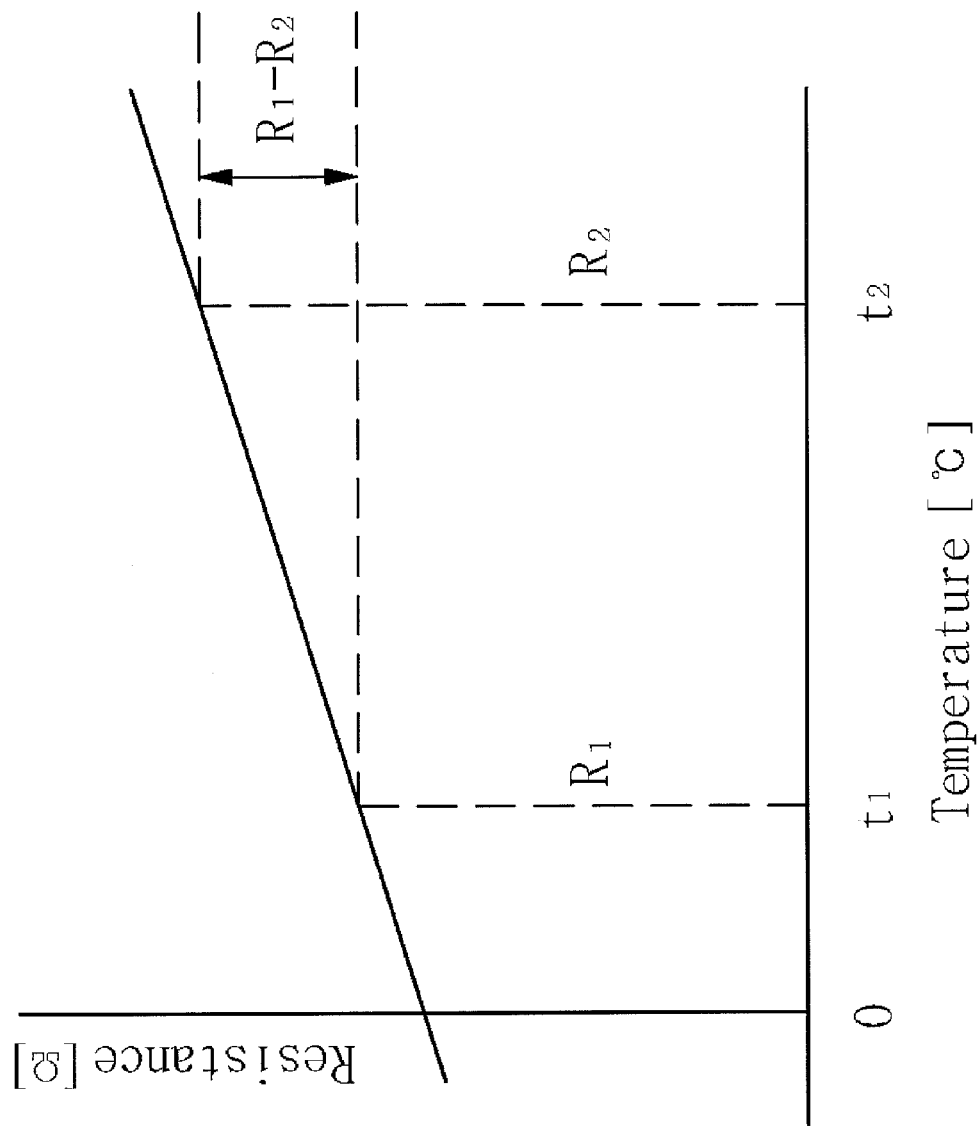
FIG. 3 is a graph illustrating a change of a copper resistance to the temperature.

FIG. 3 is a graph showing the resistance change of a copper to a temperature change. The resistance of a metal is increased according to the raising of its temperature. That is why the thermal vibration of metal atomics disturbs the movement of free electronics as it gets harder and harder according to the temperature raising. The phenomena of an electrical wire is defined into a temperature resistance coefficient as the ratio of the change of the electrical resistance in a wire caused by a change in its temperature of 1° C. as related to its resistance at 0° C.

Therefore, the temperature resistance coefficient is obtained by the change of the resistance according the change of the temperature.

$$at = r/Rt = a0R0/R0(1+a0t) = a0/(1+a0t)$$

Wherein,
a0 is a temperature resistance coefficient at 0° C.
at is a temperature resistance coefficient at t° C.,
R0 is a conductor or electrical wire resistance at 0° C.

Rt is a conductor or electrical wire resistance at t° C.
t is a conductor or electrical wire temperature.
r is a resistance changing value at 1° C.
In case of a standardization working together, $$a0=1/234.5, at=1/(234.5+t)$$

Assuming that a normal consumption power is 1100 W at a power source of 220V and 5 A and a resistance of an A section is a 10 ohm, the electrical wire at the A section generates a joule heat of 250 W (W=I²R), so its resistance is increased as the temperature is raised at that section. Thereafter, as the joule heat is repeatedly increased, a dangerous accident may happen at the A section. This reason is why a current from an interrupter is supplied in a normal rate range even through the temperature is increased at the A section.

In order to prevent this phenomenon, it is noted that it takes precautions against a possible accident by measuring a temperature, a current, power applying time, etc. of a power line at any section and varying an interrupting current (maximum allowance current) of an interrupter.

Figure 4:
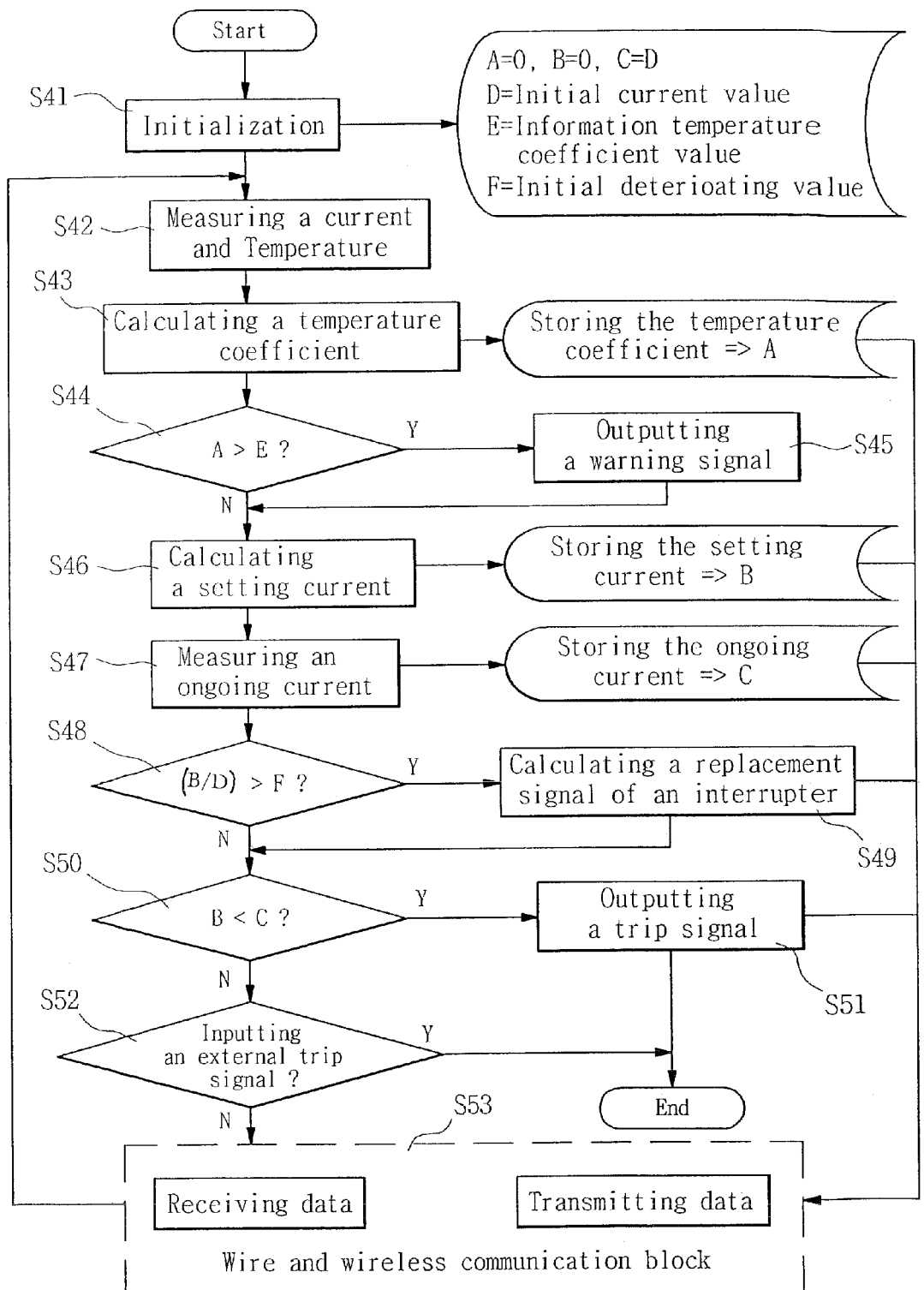
FIG. 4 is a flow chart illustrating a control method of an automatic trip device including steps of measuring a temperature and current of a power line and interrupting the power supply based on the raising of the temperature.

FIG. 4 is a flow chart showing a control method of an interrupter for measuring the temperature and current of a power line and interrupting the power supply to the power line based on the temperature raising.

A control portion 18 performs initial step S41 of setting a temperature resistance coefficient to give a warning if a temperature resistance coefficient, for example 1/(234.5+62) =0.00337 at 62° C., is higher than a warning one and setting a current measured on the power line 300 on the basis of the warning temperature resistance coefficient as a setting current. The initial step S41 goes to steps S42 and S43 to measure a temperature of the power line and calculate the temperature resistance coefficient to store them in a memory in order. Step S42 goes to step S44 to judging whether the calculated temperature resistance coefficient is higher than the warning one. If so, step S44 goes to step 45 to control a warning portion 17 to give a warning signal. Step S44 moves to step 46 to calculate a setting current flowing on the power line 300 based on the warning temperature resistance coefficient to store it in the memory, if the calculated temperature resistance coefficient is smaller than the warning one. At step S47, the current sensor 12 on the power line 300 to store in the memory measures an ongoing current.

Step S47 moves to step S48 to judge whether a value dividing the setting current by the initial current is higher than the initial deteriorating one. If so, step S48 goes to step S49 to give a replacement signal of an interrupter. If not, step S48 moves to step S50 to judge whether the setting current is smaller than the measuring current. If so, step S50 moves to step S51 to output a trip signal.

On the contrary, if the setting current is higher than the measuring one, step S50 moves to step S52 to judge whether an external trip signal is inputted. If so, a system programming is terminated. Otherwise, if not, step S52 moves to step S53 to control a communicating portion to receive data including the temperature coefficient, the setting current, the ongoing measuring current, the interrupter replacement signal and the trip signal, transmit the data to a system computer and return to step S42 to store the data and then repetitively perform the following procedures.

Herein, it is noted that according to the invention, a plurality of automatic trip devices mounted everywhere in a main interrupter, a sub-interrupter, an intermediate adapter, an illustrating equipment and mechanism, various terminal devices, etc. can be constructed as a network system to enable the data communication with each another.

Figure 5:
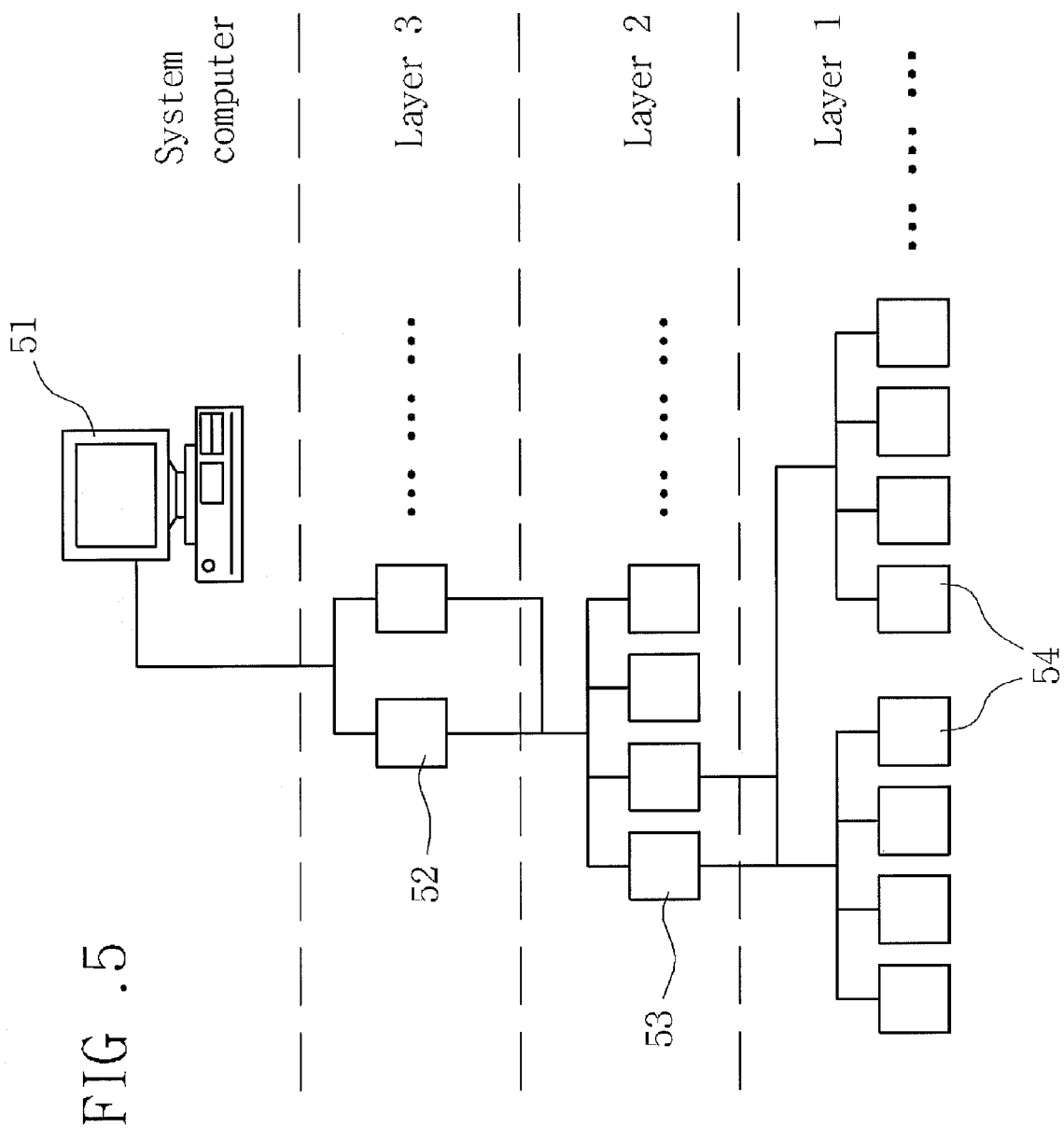
FIG. 5 is a distribution diagram illustrating a network system for the automatic trip according to the invention.

FIG. 5 shows a distribution diagram of a network system for a plurality of automatic trip devices. The network system comprises a system computer 51 mounted in the utmost layer to process, analyze and display data collected from automatic trip devices 52, 53, 54 placed in its lower layers in order to enable users to be grasped and transmit user's commands to the lower layers.

The automatic trip devices 52 and 53 are mounted in main and sub interrupters constituted as intermediate layers 2 and 3 to analyze/compare data collected from the automatic trip device 54 mounted in the lowest layers and transfer them to the system computer 51 or the automatic trip devices in the upper intermediate layers 2 and 3 over them. Herein, the intermediate layer may be constructed as a plurality of layers. The automatic trip devices 54 are mounted in various electrical appliance equipment and mechanism in the lowest layer 4 and directly connected to the power line to collect data including a current, a frequency, a temperature, etc., and detect an emergency state in order to interrupt the power supply and transmit the collected data to the automatic trip devices 52 and 53 placed in its upper intermediate layers, in which the emergency state often occurs in case that upon comparing the temperature resistance coefficient calculated by a measured temperature with the warning temperature resistance coefficient previously set, the calculated temperature resistance coefficient is higher than the warning one.)

Figure 6:
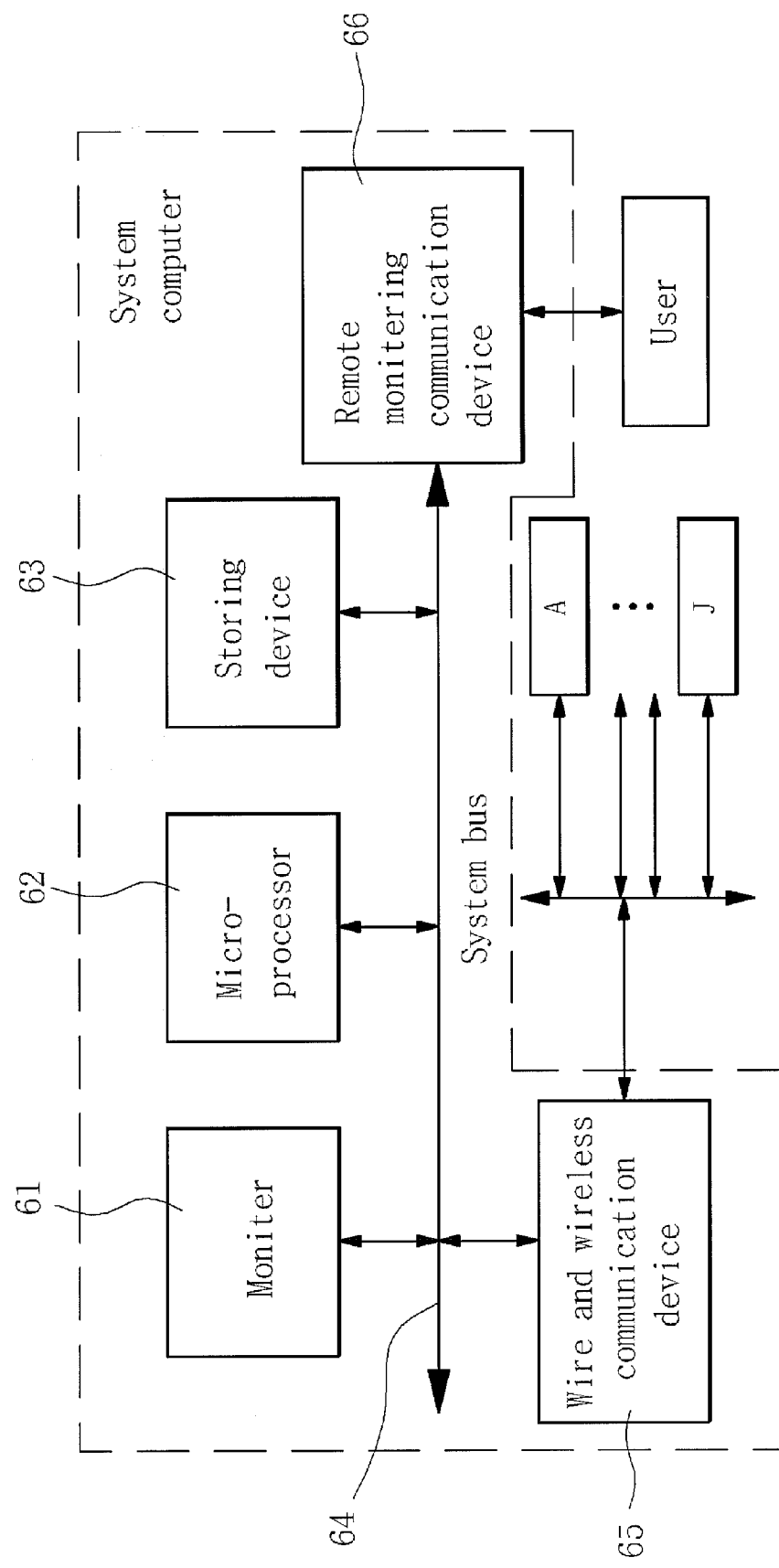
FIG. 6 is a schematic block diagram illustrating a configuration of an automatic trip system according to the invention.

FIG. 6 shows a configuration of a computer system according to the invention.

The computer system 60 comprises a monitor 61 for monitoring a state of each of automatic trip devices connected to be constituted as the network system and a microprocessor 62 for controlling each of portions connected thereto to receive data from all automatic trip devices connected to be constituted as the network system through a wire or wireless communication device, store the receiving data in a storing device 63 and process the data to display the processed results on the monitor 61.

The storing device 63 also stores the data related to the state of each of the automatic trip devices inputted through the network system therein. A system bus 64 is provided to form passages or data lines for transmitting the data and signals between the microprocessor 62 and each of devices or portions connected thereto. A wire and wireless communication device 65 is provided to make the data communication between each of the automatic trip devices mounted on the receptacle, terminal equipments, the sub-interrupter, etc. and the microprocessor 62. A remote monitoring communication device 66 is provided to display the data inputted from each of automatic trip devices mounted on the receptacle, the terminal equipments, the sub-interrupter, etc.

Figure 7:
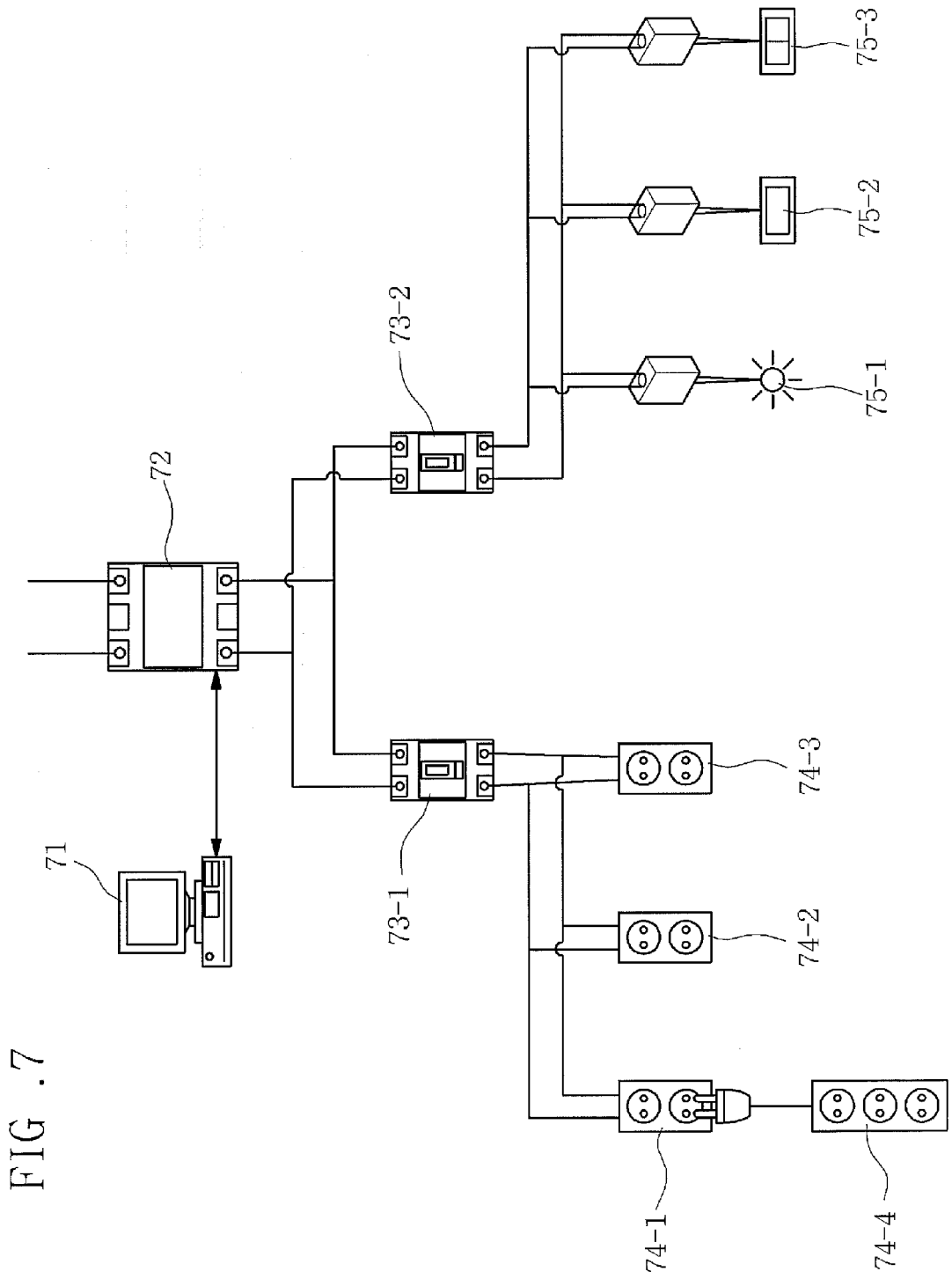
FIG. 7 is a view illustrating a configuration of constructing a plurality of automatic trip devices in a network system according to the invention; and, FIGS. 8A and 8B are flow charts illustrating a method of communicating between a system computer or user's terminal mounted in an utmost layers and a plurality of automatic trip devices in intermediate and lowest layers constituted as a network system.

FIG. 7 shows an embodiment of constructing a plurality of automatic trip devices as a network system according to the invention.

A system computer 71 is placed in an utmost layer to process, analyze and display data collected from each of automatic trip devices placed in its lower layers. The system computer 71 also controls a main interrupter 72 of an upper layer, for example an automatic trip device 52, while enables users to be grasped and transmit user's commands to the lower layers.

The system computer 71 analyzes/compares data collected from sub-interrupters 73-1 and 73-2 accommodating automatic trip devices 53 mounted in an immediate layer and receptacles 74-1, 74-2, 74-3 and 74-4, an illuminating equipment and mechanism 75-1, an electrical appliance equipment and mechanism 75-2 that the possibility of overheating danger is relatively higher, an appliance equipment and mecha-nism 75-3 that can be connected without any plug, etc., which accommodates the automatic trip device 54 in the lowest layer, respectively, and then transfer them to the system computer 71 and the sub-interrupter 73 accommodating the automatic trip device 53 in the intermediate layer. The main and sub interrupters, receptacles, electrical appliance equipment and mechanisms function to interrupt the power supply through the power lines connected thereto according to the control of the system computer 71.

On the other hand, the automatic trip devices 54 in the lowest layer are the receptacles 74-1, 74-2, 74-3 and 74-4, an illuminating equipment and mechanism 75-1, an electrical appliance equipment and mechanism 75-2 that the possibility of overheating danger is relatively higher, an appliance equipment and mechanism 75-3 that can be connected without any plug, etc. collect data including a current, a frequency, a temperature, etc., and detect an emergency state in order to interrupt the power supply and transmit the collected data to the sub-interrupters 73-1 and 73-2 accommodating the automatic trip device 53 in the upper intermediate layer.

Figure 8A:
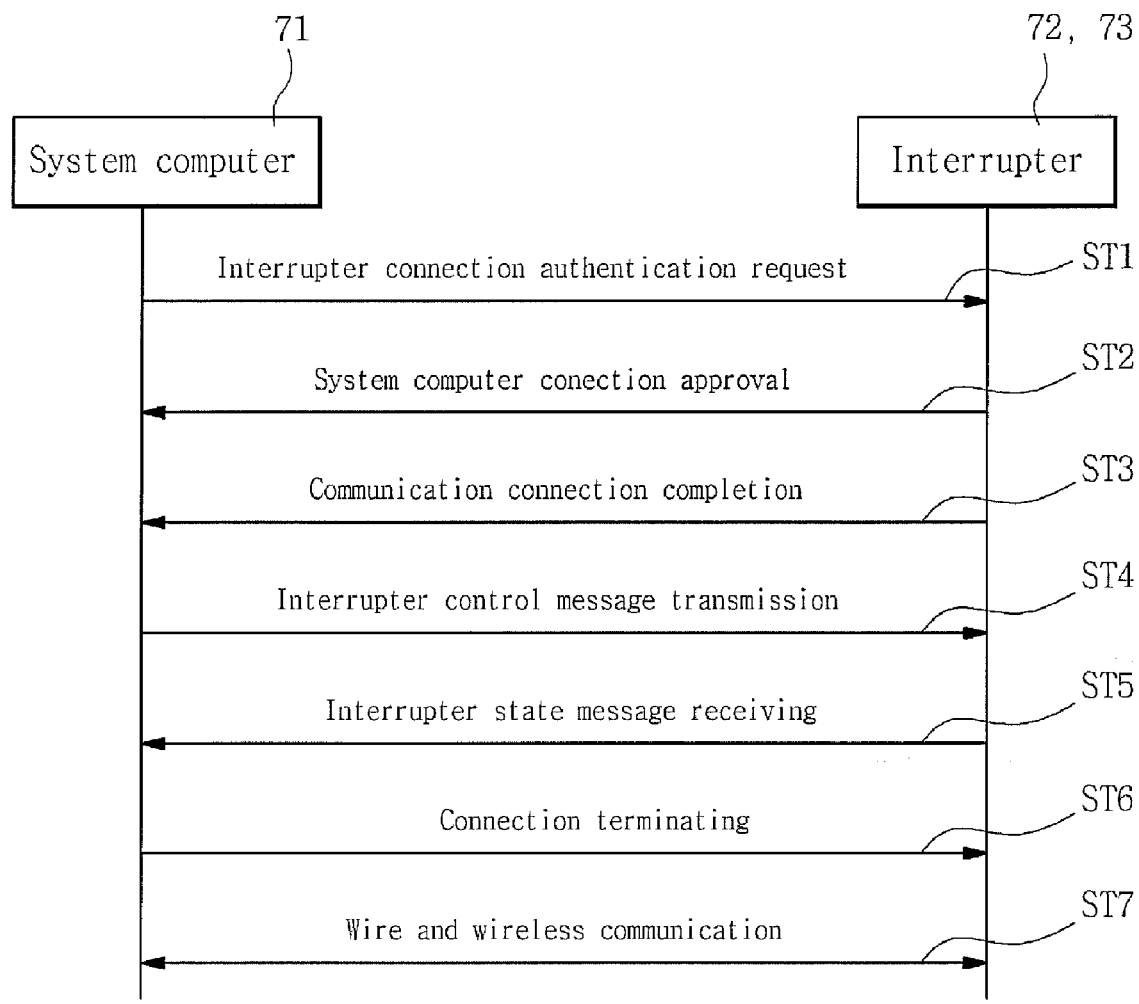
Figure 8B:
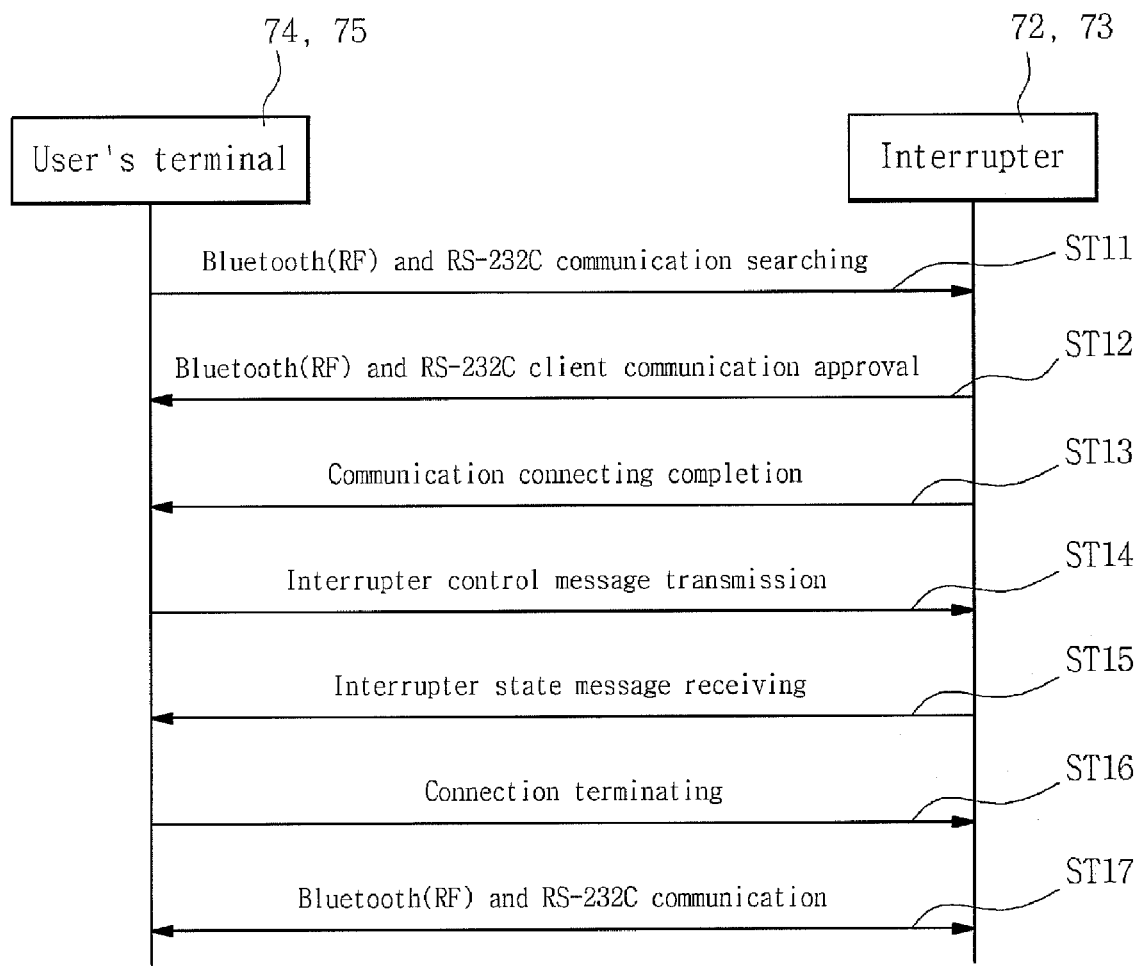

FIGS. 8A and 8B show flow charts illustrating a method of communicating between a system computer or user's computer and a plurality of automatic trip devices constituted as a network system.

At step ST1, a system computer 71 requests the interrupter connection authentication from a main interrupter 72. Step ST1 moves in order to steps ST2 and ST3 that the main interrupter 72 transmits a connection approval signal and the communication connection completion signal to the system computer 71.

After the completion of the communication connection, the system computer 71 performs steps ST4 and ST5 of transmitting the interrupter control message to the main interrupter 72 and receiving the interrupter state message from the system computer 71. After receiving the interrupter state message from the main interrupter 72, the system computer 71 performs steps ST6 and ST7 of transmitting the communication connection-terminating signal to the main interrupter 72 and then is switched into a wire and wireless communication mode by a wire and wireless communicating device 65.

As described above, it is noted that the system computer 71 is communicated with the main interrupter 72 accommodating the automatic trip devices mounted in the intermediate layers.

On the other hand, the system computer 71 or user's terminal can be communicated with the main interrupter 72, the receptacles 74-1, 74-2, 74-3 and 74-4 in the lowest layer, the illuminating equipment and mechanism 75-1, the electrical appliance equipment and mechanism 75-2 that the possibility of overheating danger is relatively higher, the appliance equipment and mechanism 75-3 that can be connected without any plug, etc., respectively.

At step ST11, a user's terminal judges whether it is possible for the system computer 71 accommodating the main interrupt 72 to be communicated with a receptacle 74 and automatic trip devices in the illuminating equipment and mechanism 75 placed in the lowest layer through the wire and wireless communication device 65 including a bluetooth and RSC-232C. The system computer 71 performs steps ST12 and ST13 of transmitting the communication connection approval signal and then the communication connection completion signal in order to the user's terminal through the wire and wireless communication device 65.

After the completion of the communication connection, the user's terminal accommodating the automatic trip devices 74 and 75 in the lowest layers performs steps ST14 and ST15 of transmitting the interrupter control message to the main interrupter 72 and receiving the interrupter state message from the system computer 71. After receiving the interrupter state message from the main interrupter 72, the user's terminal accommodating the automatic trip devices 74 and 75 in the lowest layers the system computer 71 performs steps ST16 and ST17 of transmitting the communication connection-terminating signal to the main interrupter 72 and then is switched into a wire and wireless communication mode by the wire and wireless communicating device 65.

Acting Effect

As described above, the invention can measure a temperature and use current of a power line to judge whether they are normal or not. Based on this judgment, a warning is reported while a power supply is interrupted to prevent the breakage of the power line and the occurrence of a fire due to the overload (Poor contact, shortage, etc.) of the power line. The system network function and monitoring function allow users to know the status of power consumption.

What is claimed is:

1. An automatic trip device comprising:
   a temperature sensor for detecting a temperature of a power line;
   a current sensor for measuring a current of the power line;
   a data memory for storing temperature and current data measured from the temperature sensor and the current sensor;
   a trip portion for interrupting a power supply from the power line;
   a warning portion for giving a warning signal to an alarm; and
   a control portion calculating a temperature resistance coefficient based on the stored temperature data, comparing the calculated temperature resistance coefficient with a warning temperature resistance coefficient previously stored, and controlling the warning portion to generate the warning signal if the calculated temperature resistance coefficient is higher than the previously stored warning temperature resistance coefficient.

2. The automatic trip device as claimed in claim 1, wherein the control portion is configured to:
   calculate a maximum allowance current according to the calculated temperature resistance coefficient;
   compare the calculated maximum allowance current with the measured current; and
   control the trip portion to interrupt the power supply from the power line, if the measured current is higher than the maximum allowance current.

3. A method of outputting a replacement signal of an interrupter comprising:
   setting an initial deteriorating value which is a reference for the deterioration of a power line;
   measuring a temperature of a power line to calculate at least one resistance temperature coefficient;
   calculating a maximum allowance current based on the calculated temperature resistance coefficient; and
   outputting, using a processor circuit, a replacement signal of the interrupter if a value of the maximum allowance current divided by an initial current value is higher than the initial deteriorating value.

4. The method as claimed in claim 3, further comprising:
   measuring a current of the power line;
   comparing the calculated maximum allowance current with the measured current; and
   outputting a trip signal if the measured current is higher than the maximum allowance current.

* * * * *